(12) United States Patent
Jeyaseelan et al.

(10) Patent No.: US 8,868,948 B2
(45) Date of Patent: *Oct. 21, 2014

(54) METHOD AND SYSTEM FOR COORDINATING LINK POWER MANAGEMENT WITH PLATFORM POWER MANAGEMENT

(75) Inventors: Jaya L. Jeyaseelan, Cupertino, CA (US); James J. Walsh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/597,045

(22) Filed: Aug. 28, 2012

(65) Prior Publication Data

US 2012/0324265 A1 Dec. 20, 2012

Related U.S. Application Data

(63) Continuation of application No. 12/146,873, filed on Jun. 26, 2008, now Pat. No. 8,255,713.

(51) Int. Cl.
*G06F 1/26* (2006.01)
*G06F 1/32* (2006.01)

(52) U.S. Cl.
CPC .............. *G06F 1/3203* (2013.01); *G06F 1/325* (2013.01)
USPC ........................................................ 713/320

(58) Field of Classification Search
CPC ........................................................ G06F 1/32
USPC ........................................................ 713/320
See application file for complete search history.

(56) References Cited

U.S. PATENT DOCUMENTS

| 7,225,350 B2 * | 5/2007 | Gutman et al. ................ 713/323 |
| 7,343,502 B2 | 3/2008 | Samson et al. |
| 7,716,506 B1 * | 5/2010 | Surgutchik et al. ........... 713/321 |
| 7,984,314 B2 | 7/2011 | Cooper et al. |
| 2004/0088590 A1 | 5/2004 | Lee et al. |
| 2004/0128576 A1 | 7/2004 | Gutman et al. |

(Continued)

FOREIGN PATENT DOCUMENTS

| DE | 102009015495 | 12/2009 |
| TW | I304170 | 12/2008 |

OTHER PUBLICATIONS

Office Action for Chinese Patent Application No. 200910150892.2 (+ English translation) mailed Dec. 1, 2010, 4 pages.

(Continued)

*Primary Examiner* — Thomas Lee
*Assistant Examiner* — Xuxing Chen
(74) *Attorney, Agent, or Firm* — Blakely, Sokoloff, Taylor & Zafman LLP

(57) ABSTRACT

A method, apparatus, and system for coordinated link power management. Some embodiments of a method include receiving an exit latency for each of a group of link states for a link, with a device being coupled to an interconnect via the first link. A latency tolerance value is determined and communicated, and a platform latency is received. The method further provides for determining a link budget for the device, the link budget indicating an amount of time available for an exit from a link state for the device; and selecting one of the link states based at least in part on the link budget.

17 Claims, 6 Drawing Sheets

(56) References Cited

U.S. PATENT DOCUMENTS

| | | | |
|---|---|---|---|
| 2005/0097378 A1 | 5/2005 | Hwang | |
| 2008/0288798 A1* | 11/2008 | Cooper et al. | 713/322 |
| 2009/0172434 A1 | 7/2009 | Kwa et al. | |
| 2009/0249103 A1 | 10/2009 | Jeyaseelan et al. | |
| 2010/0169684 A1 | 7/2010 | Jeyaseelan et al. | |
| 2010/0169685 A1 | 7/2010 | Gough et al. | |
| 2011/0078473 A1 | 3/2011 | Kwa et al. | |
| 2011/0302626 A1 | 12/2011 | Kwa et al. | |

OTHER PUBLICATIONS

Office Action from DE Patent Application No. 102009030544.0 (+ English translation) mailed Nov. 22, 2011, 16 pages.

"Designing Power-Friendly Devices", White Paper Intel Xeon Processor MP Platforms; Intel Corporation Copyright 2007; 18 pages.

"Latency Tolerance Reporting", Intel; PCI-SIG Draft Engineering Change Request; Jan. 22, 2008, updated Feb. 8, 2008; 6 pages.

"Latency Tolerance Reporting", Intel; PCI-SIG Draft Engineering Change Request; Jan. 22, 2008; 6 pages.

"Latency Tolerance Reporting", PCI-SIG PCIe Enhancements for Platform PM Improvement; Dec. 12, 2007 PCI Express; 6 pages.

"Latency Tolerance Reporting", Intel; PCI-SIG Draft Engineering Change Request; Jan. 22, 2008 updated Feb. 5, 2008; 6 pages.

"Optimized Buffer Flush/Fill", PCI-SIG; PCIe Enhancements for Platform PM Improvement; Dec. 12, 2007; PCI Express copyright 2007; 7 pages.

"PCI Express Base Specification Revision 2.0", PCI Express; Dec. 20, 2006; 608 pages.

Cooper, Barnes, et al., "Designing Power-Friendly Devices", Microsoft Windows Hardware Engineering Conference (WinHEC) 2007, Intel Corporation, (May 8, 2007).

Office Action dated May 20, 2013 (+ English translation), in Taiwan Patent Application No. 098120437, 5 pages.

\* cited by examiner

METHOD AND SYSTEM FOR COORDINATING LINK POWER MANAGEMENT WITH PLATFORM POWER MANAGEMENT

CROSS-REFERENCE TO RELATED APPLICATION

This application is a continuation of U.S. patent application Ser. No. 12/146,873, filed on Jun. 26, 2008, now U.S. Pat. No. 8,255,713. This application is incorporated herein by reference in its entirety.

FIELD

Some embodiments of the invention generally relate to link power states of devices. In particular, some embodiments relate to coordinated link power management.

BACKGROUND

Power management is utilized in many devices and systems to reduce power consumption and extend operation. Among the power management processes that may be utilized are link processes, in which certain links, such as links operating under a particular bus or other interconnect standard, are placed in lower power states when usage is reduced For example, the Universal Serial Bus (USB) is one of the most common interconnects on a computing platform. The USB is a polled bus, and in operation the host controller initiates all transactions on the bus, and controls the scheduling of each transaction. The bus is an I/O (input/output) interconnect for the computer platform and may include one or more links, where a link is a communication channel between ports. USB links may be subject to power management operations, placing the links in lower power states when idle.

USB has existed under evolving standards, with USB 2.0 (Universal Serial Bus Specification, Revision 2.0, released Apr. 27, 2000) being a current standard that operates at 480 mbps (megabits per second), with development being in progress to define future versions of USB at higher speeds, such as operating at up to 5 Gbps (gigabits per second). The USB 2.0 standard defines a mechanism for suspending and resuming a link, which allows for power reduction. Further, an engineering change notice (ECN) was released for USB to address link power management. (Link Power Management Addendum ECN, released Jul. 16, 2007).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
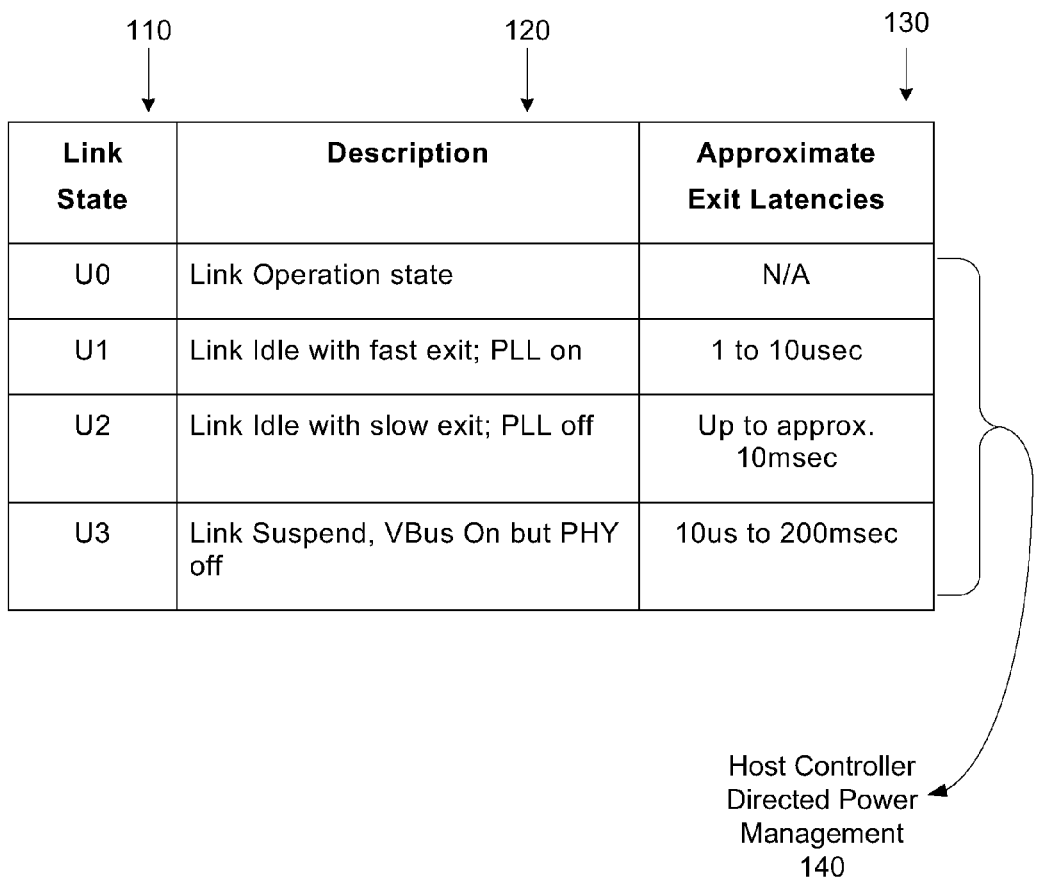
FIG. 1 is an illustration of link states addressed in an embodiment of a link power management system.

An embodiment of the invention concerns coordinated link power management.

Some embodiments of the invention provide for coordinated link power management, including the selection of appropriate link states. In particular, some embodiments of a method, apparatus, or system provide for power management of links to an interconnect, such as a USB bus. However, embodiments of the invention are not limited to any particular interconnect technology.

In some embodiments, power management of link states is implemented to offer improved power savings over conventional methods, thereby improving battery life of battery operated equipment that includes USB, such as current versions of USB and further versions (USB 3.0 and others), as well as other interconnects. While embodiments may be described herein with regard to USB, such embodiments are not limited to this type of interconnect. Embodiments may be implemented in any existing or future interconnect operating together with a host controller.

The link state mechanisms provided for USB 2.0 are coarsely grained, and a system will take several milliseconds to enter and exit the defined link states. The USB standard was originally intended to be used in conjunction with system state transitions (such as in defined lower power system states S3 and S4) that do not require fast link transition times. The USB standard does not provide for finely grained power management when, for example, the system is in the fully operational S0 system state and the device is in the D0 device state.

As indicated above, a USB 2.0 ECN proposes a USB Link Power Management (LPM) that is similar to conventional suspend/resume signaling but has faster transitional latencies. The policies for entering this LPM state are based on a period of idleness, initiated by the host controller. Future versions of the USB specification may define additional link states that can be selected based on different traffic patterns.

In some embodiments, a system provides for host controller directed link power management. In some embodiments, the system coordinates link power management to take into account latency limitations in the system, and thus allow for improved link state choices.

In some embodiments, link states are controlled and managed based on a coherent set of information from across the platform. This is in contrast to conventional processes that set link states based on an incomplete set of information available to devices, such as, for example, an idle timer within a device, which provide a process that is not robust and may cause device buffer overruns/under-runs in many cases.

In some embodiments, link power management is coordinated with platform power management. The lack of coordination may be problematic because link state exit times are generally much smaller than platform low power state exit times. In some embodiments, the end-to-end latency requirements of the device and handshaking with the power management controllers on the platform are utilized to generate a latency budget that can be used as a part of a determination of the link state.

FIG. 1 is an illustration of link states addressed in an embodiment of a power management system. The link states illustrated in FIG. 1 are examples that may be utilized in a future version of USB, but embodiments of the invention are not limited to any particular link state definitions. In some embodiments, the link states are used in a manner to provide improved power management. In FIG. 1, the table includes the defined link states 110 and a description of each state 120. In addition, the exit latencies for each link state are provided 130. As indicated, the link states U1, U2, and U3 each have a defined range for the exit latency. In operation, a device may in its configuration registers or other memory define the exit latency for each link state, with the exit latencies being within the defined ranges.

However, while the future versions of USB may be intended to define the various link states and entry and exit mechanism for these states, such specification may not be intended to define the policies for entering the various link states. In some embodiments, the defined link states are utilized in a host controller directed power management apparatus, process, or system 140, such power management to define the appropriate and entry and exit from the link states.

In some embodiments, a system includes a centralized link power management controller (which may be referred to as an "LPMC"). In some embodiments, the LPMC is integrated into a host controller. In some embodiments, platform response latency requirements are collected from all devices, and the LPMC makes decisions regarding which link states may be entered without violating these device requirements. In addition, the LPMC will further consider lower power state exit latencies that may exist for the platform. Each device or device driver may have knowledge regarding the end-to-end latency the device can tolerate based on factors such as traffic pattern, buffering on the device, and performance requirements, and in some embodiments this knowledge is utilized to coordinate link power management.

Distributed link power management methods and policies may include, for example, the PCIe specification (PCI Express Specification, including PCI Express Base Specification Revision 1.0, Jul. 22, 2002, PCI Special Interest Group, and the subsequent PCI Express Base Specification Revision 2.0, Jan. 15, 2007, PCI Special Interest Group). In certain power management processes it may be possible for devices to initiate and control link power management without knowledge of platform components that can be power managed and their associated exit latencies. In the implementation of a specific response latency requirement from a device, a link may be put into low power states that preclude the platform from putting its components into a low power state and still be able to meet the device requirements. However, the power savings that would result from putting a platform component into a low power state may actually be much greater than putting the link into a low power state, and thus the uncoordinated link states may be utilized in manner that would impede improved power efficiency of the system.

In some embodiments, a centralized link power management apparatus or system operates to collect link exit latency information from all relevant system devices. When such devices are coupled via hubs, the link exit latencies introduced by the hubs are added to the device link exit latencies. In some embodiments, the information collection may be accomplished by host processes and then subsequently programmed into the LPMC, either in raw or processed form. In some embodiments, the LPMC may alternatively "walk" the device tree and collect the information. In some embodiments, the raw or processed information may, for example, be stored locally within the LPMC, or alternatively may be stored externally to the LPMC, such as within the host controller descriptor structure in host DRAM (dynamic random access memory). In some embodiments, after initial configuration the devices will send their platform response latency requirements to the LPMC. In some embodiments, the devices send new latency messages as requirements of the devices change, due to occurrences such as, for example, a change in data traffic, or a switch between battery operation and A/C power operation.

In some embodiment, the LPMC communicates with a platform power management controller (which may be referred to herein as the "PPMC") and conducts a negotiation regarding much of the total end-to-end latency may be used to provide for link power management. Based at least in part on this negotiation and the collected information, the appropriate link state will be selected by the LPMC.

In some embodiments, the LPMC is to take the lowest of the latency requirements from all its devices and forward this to the PPMC. In some embodiments, the PPMC may communicate with any other power management controller in the platform, and in this manner the depth of platform power management is determined. In some embodiments, the PPMC then communicates the exit latency of this state to the LPMC. After subtracting this number from the latency requirement of the device, the LPMC is able to determine the appropriate link state for the device when idle.

In some embodiments, the LPMC may control link states of all links in a hierarchy, or may control link states of any device links. In a certain embodiments, the LPMC may control only device link states, and hub link states may be controlled according to, for example, the following process:

(1) If any hub downstream port is in U0, its upstream port is placed in U0;

(2) If all hub downstream ports are in U1 or a lower power state, its upstream port is placed in U1;

(3) If all hub downstream ports are in U2 or a lower power state, its upstream port is placed in U2; and (4) If all hub downstream ports are in U3 or lower power state (such as, for example, a link disabled state or a state where power is removed), its upstream port is placed in U3.

In some embodiments, for isochronous and interrupt transfers, the LPMC initiates processes to wake the links in the path to a device (with a scheduled isochronous transfer) ahead of the transfer. The amount of time ahead of the transfer is calculated using the link exit latency information collected as stated above.

In conventional operations, there exists no finely grained link power management capability in USB2.0. There thus is a significant increase in platform power when any USB2.0 device is plugged into to the platform due to continuous polling on the links when transactions are pending in the host controller. In another example, PCIe is a serial bus that provides certain link power management capability. The policies for link power management for PCIe are distributed in a platform, and are not coordinated with platform power management.

Conventional power link management may be inefficient in operation due to, at least in part, a lack of coordination in power management for a system. It may be difficult to provide effective power management for the elements of a system without coordination, especially with regard to deeper states that can generate greater power savings but at the cost of additional latency.

In some embodiments, a system provides coordinated link power management methods and policies, which may provide for the following:

(1) The system operates to shift complexity away from bus devices. The system may be utilized to allow for a robust centralized link power management policy, while acting to avoid device buffer overflows or under-runs.

(2) The LPMC may communicate with other platform power management controllers; and thus the link state that is selected may be utilized to provide for improved platform power management without unnecessary degradation to performance.

In some embodiments, a process may provide a link power management policy algorithm for non-periodic endpoints. In some embodiments, an algorithm may further include a process for devices that exist behind hubs, where the additional latencies introduced by the hubs also need to be taken into account in determining latency.

In some embodiments, for a system in which there are periodic transfers (such as isochronous and interrupt transfers), an LMPC is informed of the service interval of the periodic transfer, such as via information from the host controller. In such a process, the LMPC may be responsible for transitioning all the links in the path to a device to a U0 state in a timely fashion prior to the periodic transaction, such that the timestamps that are sent in the periodic data are sufficiently accurate for synchronization. In some embodiments, the LMPC is also aware of the depth of platform power management (the power state of the platform for power reduction), and is responsible for waking the platform from a low power state in a timely fashion so that there are no delays in data delivery.

Figure 2:
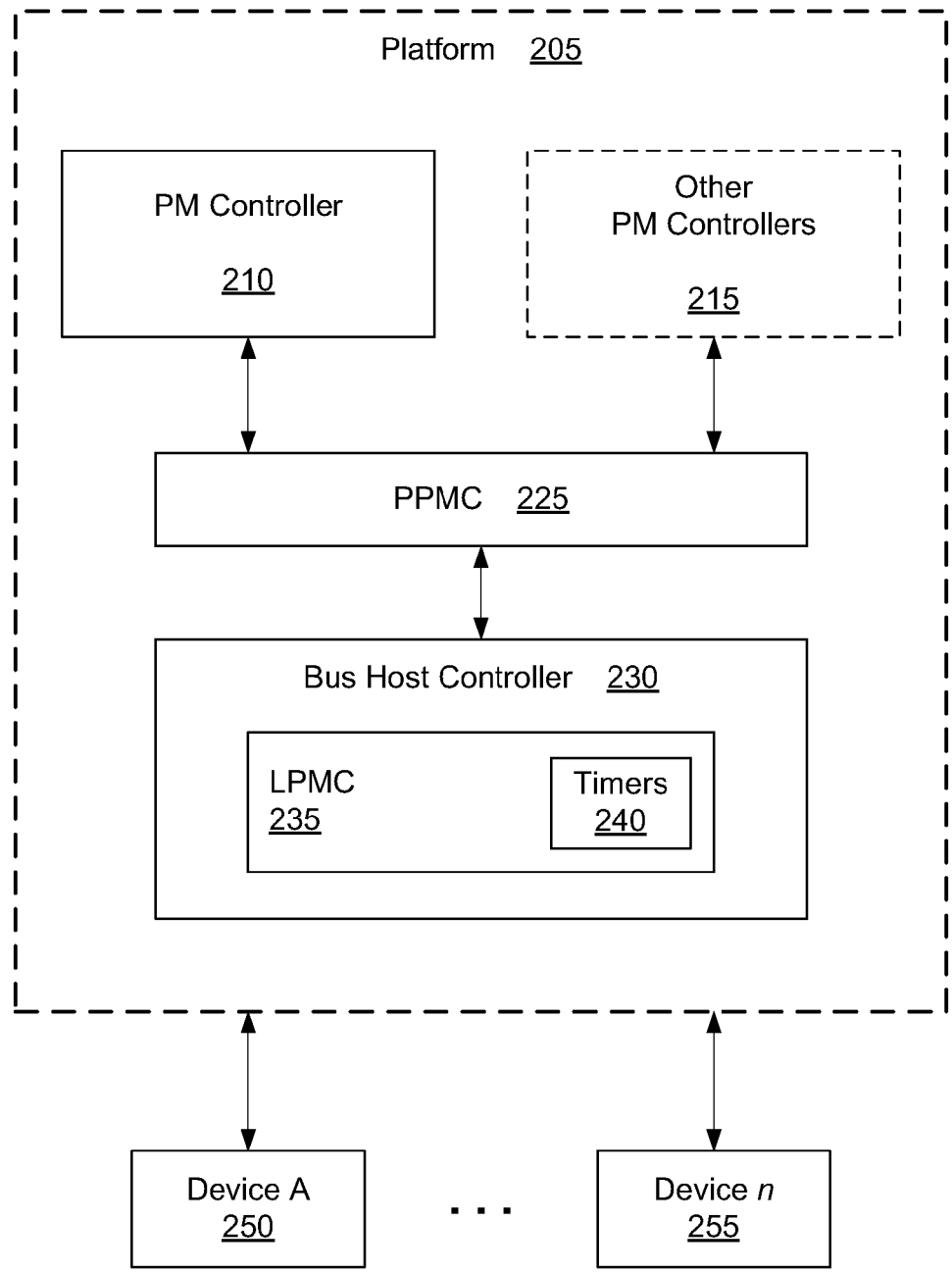
FIG. 2 is an illustration of an embodiment of a system for coordinated link management.

FIG. 2 is an illustration of an embodiment of a system for coordinated link management. In this illustration, a platform 205 includes one or more power management controllers, such as PM controller 210 (which may be a part of a processor) and any other power management controllers 215. PM controller 210 may be coupled with a platform power management controller (PPMC) 225, which may be part of a control hub. The PPMC 225 may be coupled with an interconnect host controller such as bus host controller 230, which may be, but is not limited to, a serial bus controller such as a USB host controller. The bus host controller includes a link power management controller (LPMC) 235. The LPMC 235 operates to coordinate bus link power management with power management of the platform 205. The LPMC 235 may utilize one or more timers 240 in link power management. Timers may vary in different implementations, and may, for example, represent different timer elements or may represent various timer values for a timer element. The LPMC may provide for power management of links to one or more devices, such as illustrated device A 250 through device n 255. In some embodiments, the LPMC 230 communicates with the attached devices 250-255 to determine the latency tolerance of the devices, as well as the exit latency for one or more link states. The LPMC 230 operates to notify the PPMC 225 regarding the latency tolerance of the one or more attached devices 250-255, with the PPMC 225 communicating with any other power management controllers, such as PM controller 210. The PPMC 225 is to return an exit latency for the platform 205. The LPMC 230 applies the platform exit latency to determine a link budget for each link to the attached devices 250-255, and establishes a link state for each link that is within the appropriate link budget.

Figure 3:
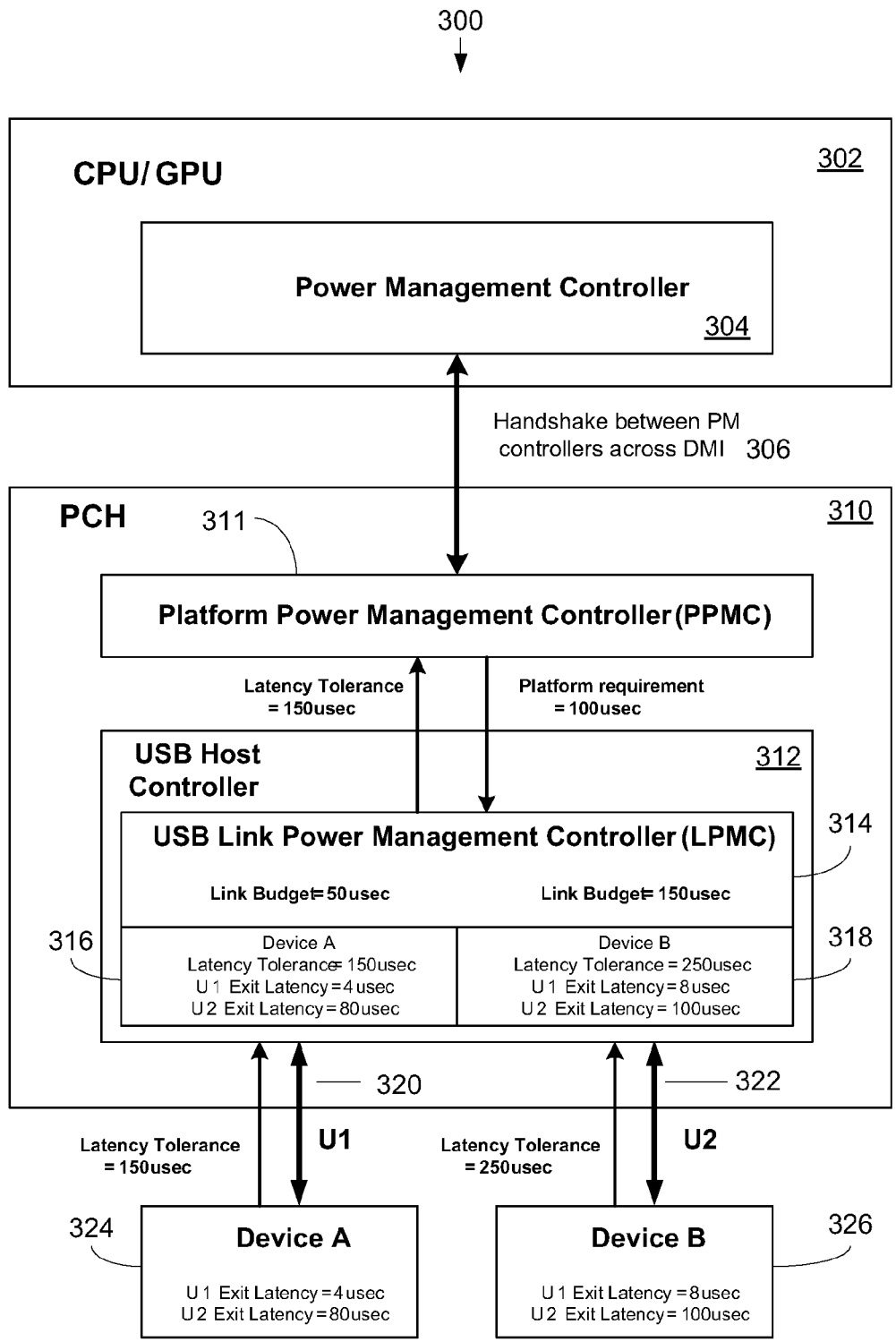
FIG. 3 is an illustration of an embodiment of a power management system.

FIG. 3 is an illustration of an embodiment of a power management system. In some embodiments, a system 300 may be, but is not limited to, a computing system, personal computer, server, mobile computer, or other similar system. In some embodiments, the system 300 includes a processor 302, which may be a central processing unit (CPU) or graphics processing unit (GPU). The processor 302 may include a power management controller 304. The processor 302 may be coupled with a platform control hub (PCH) 310 that includes a platform power management controller (PPMC) 311 and a USB controller 312, the USB controller 312 including a USB link power management controller (LPMC) 314. The PPMC 311 may communicate with other power management controllers for the platform, as shown with the handshake between the PPMC 311 and the power management controller 304 across an interface, such as the illustrated direct media interface (DMI) 306. The USB controller 312 is coupled with any number of USB compatible devices, including, for example, Device A 324 coupled via first USB link 320 and Device B 326 coupled via second USB link 322.

In this illustration, the LPMC 314 is to coordinate link power management. In this example, device A 324 may have latency tolerance of 150 μsec, with the U1 state exit latency being 4 μsec and U2 being 80 μsec. Device B 326 may have a latency tolerance of 250 μsec, with the U1 state exit latency being 4 μsec and U2 being 100 μsec. In a conventional operation, device A 324 might transition to U2 because the latency for exiting this state is less than the latency tolerance of the device. In some embodiments, the link management is coordinated to improve power management. In an embodiment, the latency tolerance of 150 μsec, the lowest latency tolerance for the devices, is provided to the LPMC 314. The LPMC provides the latency tolerance to the PPMC 311, which then returns a platform requirement of 100 μsec for a lower power state of the platform. This requirement may be determined after communication of the PPMC 311 with other power management controllers on the platform. Using this data, the LPMC 314 is able to determine a link budget of 50 μsec for link power management of device A 324. Based on at least the link budget, the link to device A 324 is transitioned to U1 because this is within the link budget of 50 μsec, while U2 would not be within the budget. The LPMC 314 further determines a link budget 150 μsec for device B 326. With this link budget for device B, it is possible to transition to U2 because the exit latency of 100 μsec is less than the link budget of 150 μsec. Thus, the first link 320 is transitioned to U1 when idle, while the second link 322 is transitioned to U2 when idle.

Figure 4:
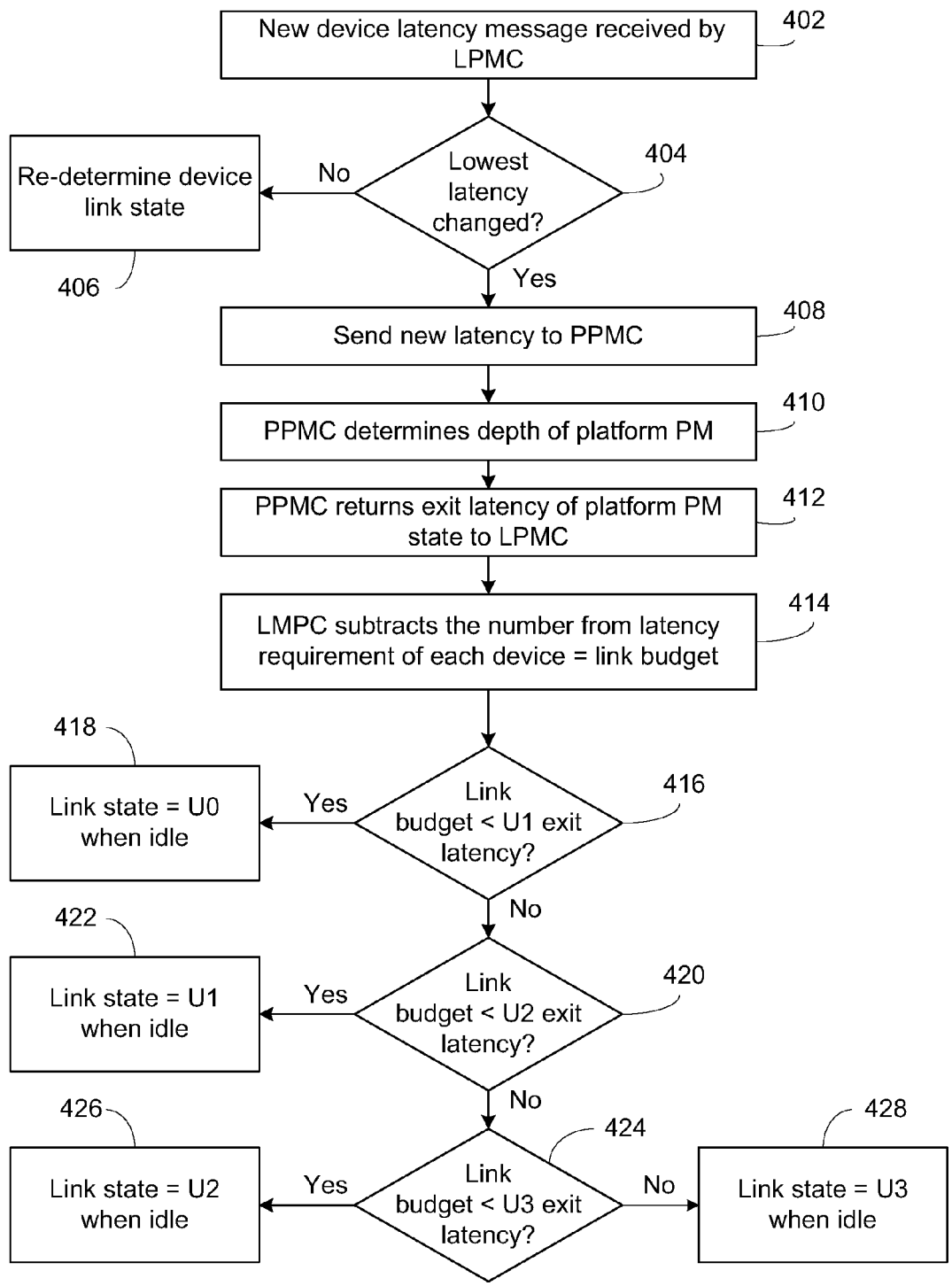
FIG. 4 is a flowchart to illustrate an embodiment of a process for determining a link state.

FIG. 4 is a flowchart to illustrate an embodiment of a process for determining a link state. In this illustration, a new device latency message is received by an LPMC 402. Such latency message may be an initial message from a device, or a later updated message that is issued as conditions change. If the lowest latency of the attached devices has changed 404, then the new latency is sent from the LPMC to the PPMC 408 for determination of platform power management. If the lowest latency for the attached device has not changed 404, then there is a redetermination of the device link state 406 without any requirement for determining platform power management. With the lowest latency information, the PPMC determines the depth of the platform power management 410, and returns the exit latency of the platform power management state to the LPMC 412. The LPMC then subtracts the determined platform exit latency time from the exit latency requirement of each device to determine a link budget for each 414.

In some embodiments, the link budget is compared to the established exit latency for each link state to determine the link state when the link is idle. If the link budget is less than the U1 exit latency 416, then link state remains at U0 when the link is idle 418 because transitioning to a lower power state will require too much time. If the link budget is not less than the U1 exit latency but is less than the U2 exit latency 420, then link state is transitioned to U1 when the link is idle 422. If the link budget is not less than the U2 exit latency but is less than the U3 exit latency 424, then link state is transitioned U2 when the link is idle 426. Otherwise, the link state is U3 when the link is idle 428.

Figure 5:
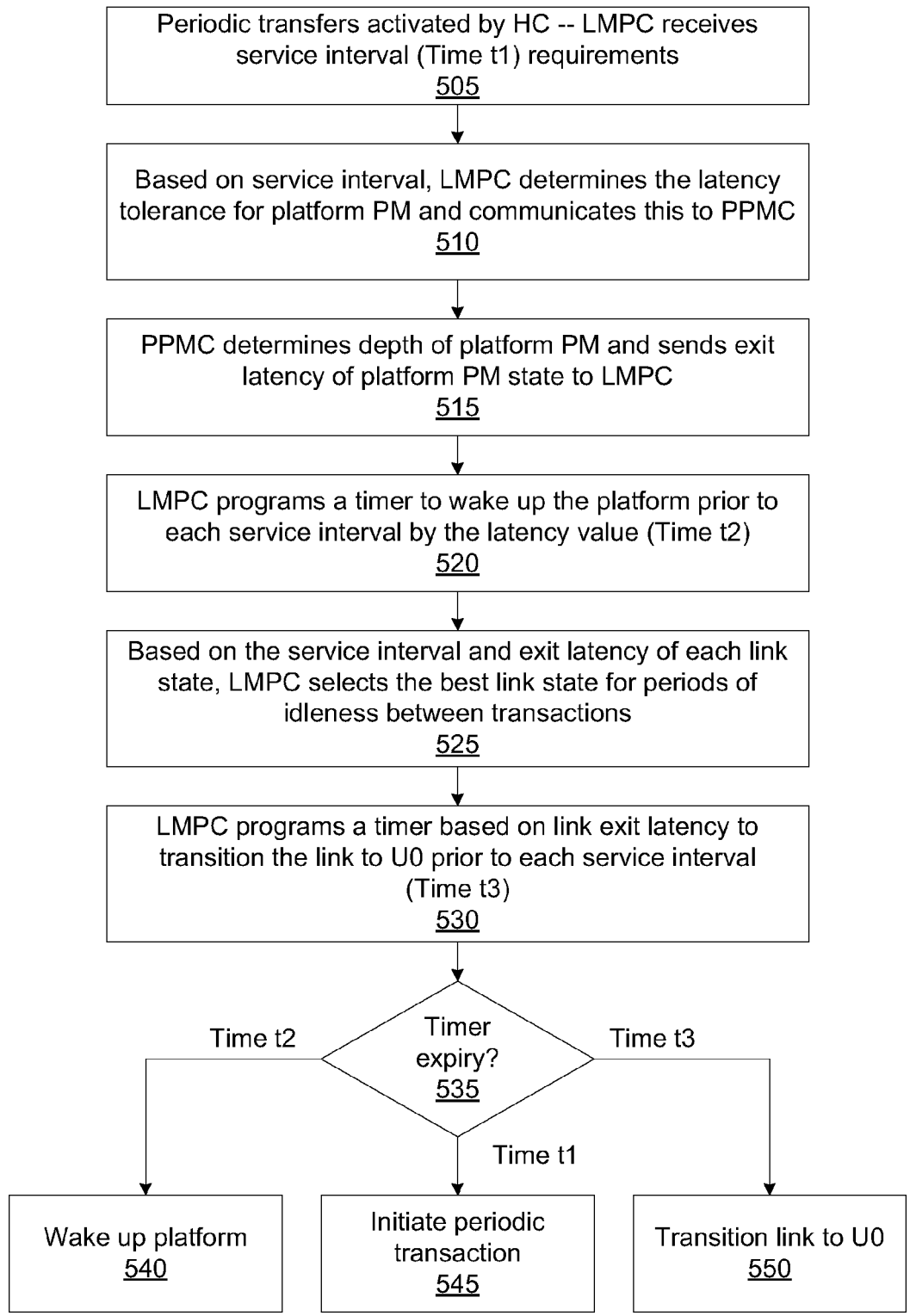
FIG. 5 is a flowchart to illustrate an embodiment of a process for power management for periodic transfers.

FIG. 5 is a flowchart to illustrate an embodiment of a process for power management for periodic transfers. In this illustration, periodic transfers are activated by the host controller, and the LPMC receives the service interval ("Time t1") requirements 505. Based on the received service interval, the LPMC determines a latency tolerance for the platform power management and communicates the latency tolerance to the PPMC 510. The PPMC then determines the depth of the platform power management, and sends the exit latency of the platform power management state to the LMPC 515.

Based on this information, the LMPC determines a time for waking up the platform prior to each service interval ("Time t2") and programs a timer with such time 520. Based on the service interval and the exit latency required for each link state, the LPMC selects the best link state for periods of idleness between transactions 525. LMPC then programs a timer for each link based on the determined link exit latency to allow for transitioning the link to U0 (fully operational state) prior to each service interval 530.

For expiration of the timers 535, if a Time t1 expires the host controller initiates the periodic transaction 545. If a Time t2 expires, then the LPMC acts to wake up the platform for operation 540. If a Time t3 expires, then the LPMC transitions the link back to U0 550.

Figure 6:
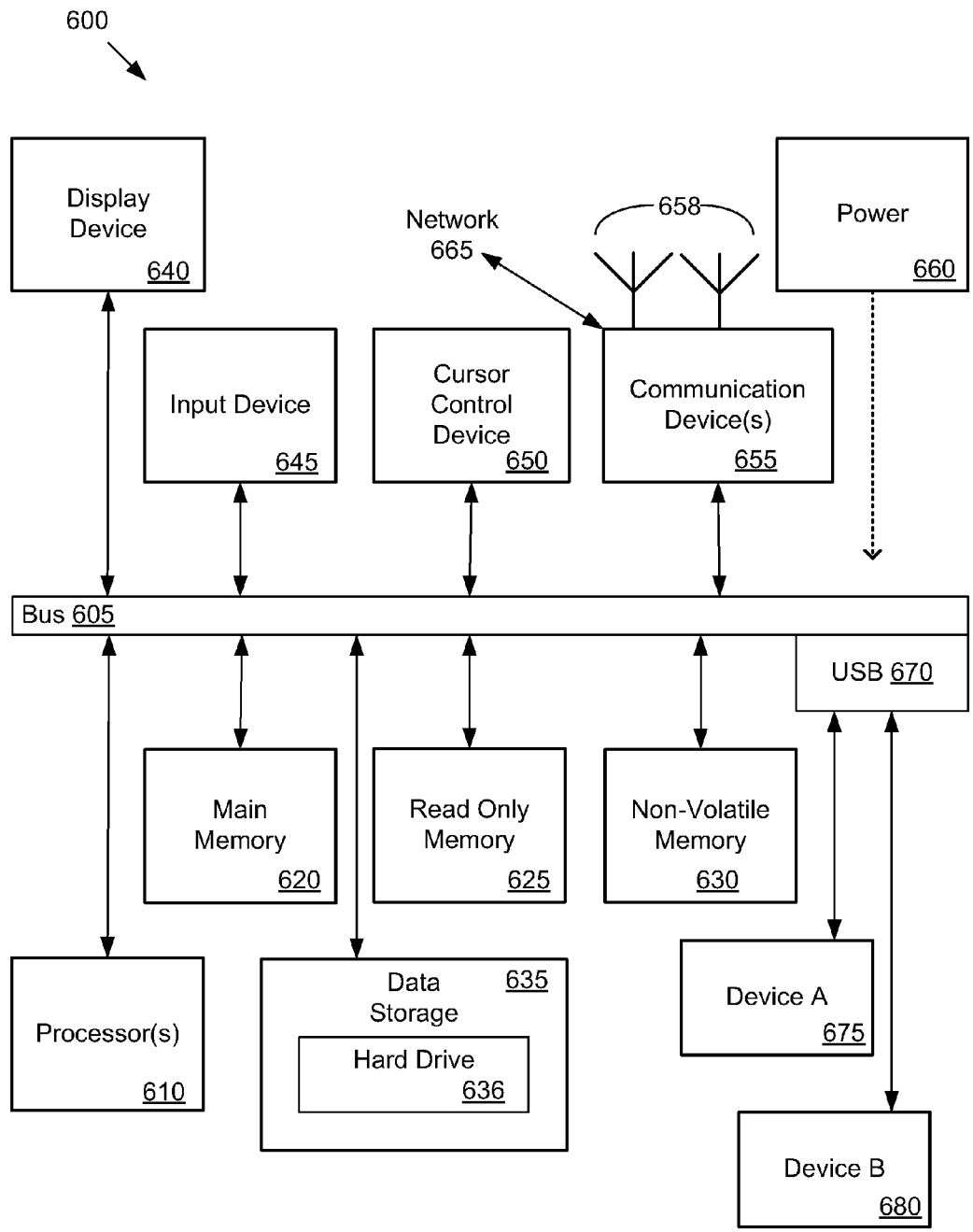
FIG. 6 is an illustration of a computer system that may include an embodiment of coordinated link power management.

FIG. 6 is an illustration of a computer system that may include an embodiment of coordinated link power management. In this illustration, certain standard and well-known components that are not germane to the present description are not shown. Under some embodiments, a computer 600 comprises an interconnect, such as bus 605, or other communication means for communicating information, and a processing means such as one or more processors 610 coupled with the bus 605 for processing information. The processors 610 may comprise one or more physical processors and one or more logical processors. Further, each of the processors 610 may include multiple processor cores. The bus 605 is illustrated as a single bus for simplicity, but may represent multiple different buses and the component connections to such buses may vary. The bus 605 shown in FIG. 6 is an abstraction that represents any one or more separate physical buses, point-to-point connections, or both connected by appropriate bridges, adapters, or controllers. The bus 605 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The computer 600 further includes a serial bus, such as USB bus 670, to which may be attached one or more USB compatible devices, such as device A 675 and device B 680. In some embodiments, the computer 600 may support power management, including coordinated link power management for the links to the USB bus 670.

In some embodiments, the processors 610 may be utilized to support one or more virtual machines. In some embodiments, the computer 600 further comprises a random access memory (RAM) or other dynamic storage device as a main memory 620 for storing information and instructions to be executed by the processors 610. Main memory 620 also may be used for storing temporary variables or other intermediate information during execution of instructions by the processors 610. In some embodiments, data regarding link states may be stored in main memory. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include a shared memory, such as a shared BIOS/OS memory, that is accessible by multiple agents in the computer system. The computer 600 also may comprise a read only memory (ROM) 625 or other static storage device for storing static information and instructions for the processors 610. The computer 600 may include one or more non-volatile memory devices 630 for the storage of certain elements, including, but not limited to, system BIOS and one or more pre-OS applications.

Data storage 635 may also be coupled to the bus 605 of the computer 600 for storing information and instructions. The data storage 635 may include a magnetic disk, an optical disc and its corresponding drive, or other memory device. Such elements may be combined together or may be separate components, and utilize parts of other elements of the computer 600. In a particular embodiment, the data storage 635 may include a hard drive 636.

The computer 600 may also be coupled via the bus 605 to a display device 640, such as a cathode ray tube (CRT) display, a liquid crystal display (LCD), a plasma display, or any other display technology, for displaying information to an end user. In some embodiments, the display device 640 may be utilized to display television programming. In some environments, the display device 640 may include a touch-screen that is also utilized as at least a part of an input device. In some environments, the display device 640 may be or may include an audio device, such as a speaker for providing audio information, including the audio portion of a television program. An input device 645 may be coupled to the bus 605 for communicating information and/or command selections to the processors 610. In various implementations, the input device 645 may be a keyboard, a keypad, a touch-screen and stylus, a voice-activated system, or other input device, or combinations of such devices. Another type of user input device that may be included is a cursor control device 650, such as a mouse, a trackball, or cursor direction keys for communicating direction information and command selections to the one or more processors 610 and for controlling cursor movement on the display device 640.

One or more communication devices 655 may also be coupled to the bus 605. Depending upon the particular implementation, the communication device 655 may include a transceiver, a wireless modem, a network interface card, LAN (Local Area Network) on motherboard, or other interface device. The uses of a communication device 655 may include reception of signals from wireless devices. For radio communications, the communication device 655 may include one or more antennas 658, including any dipole or monopole antennas, as required. In one embodiment, the communication device 655 may include a firewall to protect the computer 600 from improper access. The computer 600 may also be linked to a network, such as network 665, or to other devices using the communication devices 655, which may include links to the Internet, a local area network, or another environment. The computer 600 may also comprise a power device or system 660, which may comprise a power supply, a battery, a solar cell, a fuel cell, or other system or device for providing or generating power. The power provided by the power device or system 660 may be distributed as required to elements of the computer 600. In some embodiments, the power distribution may be affected by power management, including the power management of link states.

Those skilled in the art having the benefit of this disclosure will appreciate that many other variations from the foregoing description and drawings may be made within the scope of the invention. Indeed, the invention is not limited to the details described above. Rather, it is the following claims including any amendments thereto that define the scope of the invention.

In the description above, for the purposes of explanation, numerous specific details are set forth in order to provide a thorough understanding of the invention. It will be apparent, however, to one skilled in the art that the invention may be practiced without some of these specific details. In other instances, well-known structures and devices are shown in block diagram form.

Embodiments of the invention may include various processes. The processes of the invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the invention may be provided as a computer program product, which may include a computer-readable medium having stored thereon instructions, which may be used to program a computer (or other electronic devices) to perform a process according to the invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, embodiments of the invention may also be downloaded as a computer program product.

Many of the methods are described in their most basic form, but processes can be added to or deleted from any of the methods and information can be added or subtracted from any of the described messages without departing from the basic scope of the invention. It will be apparent to those skilled in the art that further modifications and adaptations can be made. The particular embodiments are not provided to limit the invention but to illustrate it. The scope of the invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   receiving an exit latency for each of a plurality of link states for a first link, a first device being coupled to an interconnect via the first link;
   receiving a service interval for a periodic transfer, the periodic transfer to be made over the first link;
   determining and communicating a latency tolerance value for connected devices including the first device, wherein the determined latency tolerance value is based at least in part on the received service interval;
   receiving a platform latency in response to communication of the latency tolerance value;
   determining a time for waking up the platform prior to each service interval based on the platform latency; and
   selecting one of the plurality of link states for the first link based at least in part on the service interval and the exit latency for each of the plurality of link states for the first link.

2. The method of claim 1, further comprising programming a first timer, the programming of the first timer being based on the determined time for waking up the platform prior to each service interval.

3. The method of claim 2, further comprising programming a second timer to transition the first link to an operational state prior to each service interval, the programming of the second timer being based on the exit latency for the selected link state.

4. The method of claim 2, wherein a plurality of devices are coupled to the interconnect via a plurality of links, and further comprising programming a timer for each link to transition each link to an operational state prior to each service interval.

5. An apparatus comprising:
   a platform power management controller; and
   a host controller for an interconnect coupled with the platform power management controller, the interconnect host controller including a link power management controller, the interconnect to include a first link for a first device, the link power management controller to control a link state for the first link;
   wherein the link power management controller is to receive a service interval for a periodic transfer, the periodic transfer to be made over the first link, to determine a latency tolerance value for connected devices including the first device, the latency tolerance value being based at least in part on the received service interval, and to provide the latency tolerance value to the platform power management controller;
   wherein the link power management controller is to receive a platform latency requirement from the platform power management controller, and to determine a time for waking up the platform prior to each service interval based on the platform latency requirement; and
   wherein the link power management controller is to select a link state from a plurality of link states for the first link based at least in part on the service interval and an exit latency for each of the plurality of link states for the first link.

6. The apparatus of claim 5, wherein the interconnect includes a second link for a second device.

7. The apparatus of claim 6, wherein the link power management controller is to select a link state from a plurality of link states for the second link based at least in part on the service interval and an exit latency for each of the plurality of link states for the second link.

8. The apparatus of claim 5, wherein the interconnect is a bus compatible with a Universal Serial Bus (USB) specification.

9. The apparatus of claim 5, wherein the link power management controller is further to program a first timer, the programming being based on the determined time for waking up the platform prior to each service interval.

10. The apparatus of claim 9, wherein the link power management controller is to wake up the platform for operation upon expiration of the first timer.

11. The apparatus of claim 9, wherein the link power management controller is further to program a second timer to transition the first link to an operational state prior to each service interval, the programming of the second timer being based on the exit latency for the selected link state.

12. The apparatus of claim 11, wherein the link power management controller is to transition the first link to the operational state upon expiration of the second timer.

13. A system comprising:
a platform power management controller;
a host controller for a Universal Serial Bus (USB), the host controller including a link power management controller, the USB to provide a first link for a first device, the link power management controller to determine a link state for the first link;
a processor including a power management controller, the power management controller being coupled with the platform power management controller; and
a synchronous dynamic random access memory (SDRAM) to store data regarding the link states;
wherein the link power management controller is to receive a service interval for a periodic transfer, the periodic transfer to be made over the first link, to determine a latency tolerance value for connected devices including the first device, the latency tolerance value being based at least in part on the received service interval, and to provide the latency tolerance value to the platform power management controller;
wherein the link power management controller is to receive a platform latency requirement from the platform power management controller, and to determine a time for waking up the platform prior to each service interval based on the platform latency requirement; and
wherein the link power management controller is to select a link state from a plurality of link states for the first link based at least in part on the service interval and an exit latency for each of the plurality of link states for the first link.

14. The system of claim 13, wherein the link power management controller is further to program a first timer, the programming of the first timer being based on the determined time for waking up the platform prior to each service interval.

15. The system of claim 14, wherein the link power management controller is to wake up the platform for operation upon expiration of the first timer.

16. The system of claim 14, wherein the link power management controller is further to program a second timer to transition the first link to an operational state prior to each service interval, the programming of the second timer being based on the exit latency for the selected link state.

17. The system of claim 16, wherein the link power management controller is to transition the first link to the operational state upon expiration of the second timer.

* * * * *